United States Patent Office 3,284,219

Patented Nov. 8, 1966

3,284,219
INTERNALLY PLASTICIZED CASEIN

Robert B. Dean and William L. Marino, Bainbridge, N.Y., assignors to The Borden Company, New York, N.Y., a corporation of New Jersey No Drawing. Filed Nov. 22, 1963, Ser. No. 325,791
7 Claims. (Cl. 106—147)

This invention relates to the treatment of a protein with chlorocarbonate plasticizer.

Certain proteins including casein have long been used as adhesive films, coatings for leather and the like, and binders for pigments. At relatively low humidities the films, either supported or unsupported, become hard and brittle on aging, as at relative humdity below 40%. To decrease this difficulty there has been used heretofore various plasticizers for the protein, e.g., glycerol, mono-, di-, and triethylene glycols, polyethelene glycols, i.e., polyoxyethylene glycols or glycol ethers of low molecular weight, sugars and sugar alcohols. While these plasticizers are effective in freshly prepared films and coatings, the plasticizers are either volatile or of such relatively low molecular weight that they diffuse and, in either case, lose effectiveness as the protein film ages.

The present invention provides a product in which the plasticizer component is grafted onto the molecule of dry protein in acidic condition, so that the plasticizer cannot volatize or migrate and the film retains its flexibility at low humidities.

Briefly stated the invention comprises the reaction product of granulated or powdered casein or other protein of a kind to be described and a polyalkoxylated monochlorocarbonate ester, an example of which is methyl polyoxyethylene chlorocarbonate having therein 7 oxyethylene groups and being of the formula $$ClCO(OCH_2CH_2)_7OCH_3$$

The invention comprises also the process of making such product and films and articles made therefrom.

As the protein we use casein, soy protein, peanut protein or other alkali soluble protein that originally is soluble in dilute alkali such as an aqueous solution of pH 7–12 and that is film forming when cast from its aqueous solution.

The protein used is in dry condition, that is, in commercially dry form or of water content only moderately thereabove, suitably not above about 20%. The protein is used at a pH near its isoelectric point and in a range where it is insoluble in water, as at a pH of about 3–5.5. Proteins which are insoluble at a pH near their isoelectric point and are dried from a curd contains pores left by the evaporation of water. These pores are considered to be a factor in absorbing reactive chemicals; gelatin and other water soluble proteins ordinarily dry to a hard, nonporous solid which does not permit chemical reaction except at the surface of the particles. Treatment of casein or other protein in the solid state makes feasible treatment before shipment to the user. It also avoids the expense of conventional methods involving dissolving the protein in a solvent to obtain chemical reaction with all of the molecules, and prevents the formation of a significant proportion of insoluble product that results from exposing casein molecules, i.e., casein in an aqueous alkaline solution, to the chlorocarbonate. Reaction with the chlorocarbonate in the absence of water avoids loss of the chlorocarbonate by side reaction with water that otherwise would occur.

Chlorocarbonates are esters of the hypothetical chlorocarbonic acid ClCOOH. They are made by conventional methods from phosgene and an alcohol:

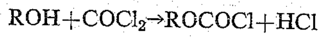

$$ROH + COCl_2 \rightarrow ROCOCl + HCl$$

Alcohol+phosgene yields chlorocarbonate+hydrogen chloride. The chlorocarbonates that we bond as plasticizers in the casein molecule are monochlorocarbonates. They derive from monohydroxy polyoxyalkalene ethers and are of general formula $ClCO(OC_nH_{2n})_xOR$, in which $n$ and $x$ are integers, $n$ is 2–4, $x$ is 2–30 and R is any alkyl group containing 1–6 carbon atoms.

Monochlorocarbonates that are particularly suitable are those in R is methyl or ethyl, $n$ is 2 and $x$ is 5–15. Thus we have used the reaction product of phosgene with the methoxy polyoxyethylene alcohol $CH_3(OC_2H_4)_7OH$ known as Carbowax 350. Another suitable chlorocarbonate is derived from Carbowax 750 which is similar to the Carbowax 350 but contains about 17 ethoxy $(OC_2H_4)$ groups.

Monochlorocarbonates of monohydroxylated polyoxyalkylene ethers suitable for plasticizing proteins are available commercially. They may be made as described in the literature or as follows:

There is first selected an alkoxy terminated polyoxyalkylene ether supplying the group $—(OC_nH_{2n})_xOR$ in the formula above. One mole of this ether is introduced slowly into a solution of 1.1 moles of phosgene in an inert solvent, suitably dry toluene in a closed container at 0° C. The container is maintained at ice temperature for one hour, then is allowed to warm to room temperature and is held there for two hours. The temperature is then raised and the toluene, hydrogen chloride and excess phosgene are removed under vacuum. The dry product is then ready for use.

Examples of the glycols to be used in the above reaction are the Carbowaxes 350 and 750 identified above and methoxy and ethoxy polypropylene oxides and polybutylene oxides having 4–40 monomeric units to the molecule of the polymer.

Other plasticizers of a temporary or migratory nature may be included as, for instance, glycerol, any water soluble glycol or any one of those named above as conventionally used for this purpose.

Proportions of the polyoxyalkylene chlorocarbonate to be combined with the protein may be varied, as from about 5% of the weight of the protein on the commercially dry basis up to 50%. The proportion recommended is 5%–20%. There is no advantage offsetting the uneconomical use of more than the equivalent quantity of the chlorocarbonate required for the reaction with the amine groups of the protein to be treated. This requires one mole of the monochlorocarbonate for each such amine group reacted, the reaction proceeding according to the following simplified equation showing the functional groups only of the chlorocarbonate and the protein:

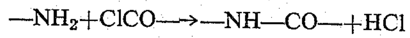

$$—NH_2 + ClCO— \rightarrow —NH—CO— + HCl$$

The resultant product is a protein substituted carbamide.

It has been found that the HCl liberated in the above reaction must be neutralized with an alkali to maintain the protein in alkali-soluble condition. Suitably one equivalent of the carbonates or bicarbonates of the alkali metals sodium, potassium or lithium are mixed with the reaction product of dry casein with one mole of the monochlorocarbonate. Salts of other weak acids such as borax may be used instead, on a stoichiometrically equivalent basis. Ordinarily we use sodium carbonate or bicarbonate. The amount admixed is sufficient to raise the pH to at least the range of the isoelectric point and suitably above 4.5 as measured in a 10% slurry in water.

Suitable proportions of the alkali are about 4–15% of sodium bicarbonate or amounts of the other alkalies equivalent as a base to this proportion of sodium bicarbonate.

As to conditions, the dry protein is mixed with the chlorocarbonate polyoxyalkylene reaction product in substantially anhydrous condition, as by introducing the latter in finely divided form into a continuously stirred mass of the selected protein in an acid resistant mixer and maintaining the temperature between about 100° F. and that of denaturing the protein. In order to decrease the time required for commercial operations, the temperature is suitably elevated to about 120°–150° F., the reaction being more rapid at elevated temperatures than at room temperature. Temperatures that are substantially above 150° F. as for example 160° have been found to cause insolubilization of a part of the protein during this treatment. Following the reaction the powdered alkali is added to neutralize the hydrogen chloride that has been liberated.

This invention will be further illustrated by detailed description in connection with the following specific examples of the practice of it, proportions here and elsewhere being expressed as parts by weight unless specifically stated to the contrary.

*Example 1*

To 100 parts of casein there were added slowly and with continuous stirring 20 parts of the reaction product of phosgene and Carbowax 350, i.e., $ClCO(OC_2H_4)_7OCH_3$. After the addition had been completed, the resulting material was held at 140° F. for 4.5 hours to complete the reaction. Six parts of dry sodium bicarbonate was then blended and the whole allowed to stand overnight, to complete neutralization of the hydrogen chloride released during the reaction.

Water was then added to a part of the mixture and 8 parts of 26° Bé. ammonia solution was added to dissolve the casein. From this solution there was cast an unsupported film of the treated casein. The film when dried and equilibrated with air at 50% and at 20% relative humidity, in different tests, showed satisfactory flexibility, even at the lower humidity, and also satisfactory elongation without substantial loss of tensile strength.

The alkali is to be added promptly after the conclusion of the reaction of the polyoxyalkylene monochlorocarbonate product with the protein, immediately after the reaction in order to avoid insolubilization of the product that otherwise occurs on long standing.

*Example 2*

Acid precipitates casein of moisture content approximately 10% was (1) reacted with the product of the reaction of phosgene with methoxy polyoxyethylene (Carbowax 350), (2) compounded with the various polyethylene glycols, i.e., polyoxyethylene glycols, which had not been reacted with the chloroformate, and which are shown in the following tables, (3) reacted with methoxy polyoxyethylene chlorocarbonate, and subsequently mixed with varying amounts of glycerol or polyethylene glycols. The mixtures (1) and (3) were held for reaction at 140° F. and then mixed with sodium bicarbonate as soon as the reaction was completed, any glycol to be used was added here, and finally the aqueous solutions were made, all as described in Example 1 except for the variations stated in the compositions. The table shows the kinds of plasticizer and alkali and percentages on the weight of the casein and tests on films cast from the solutions of the various formulas.

STIFFNESS AND STRENGTH OF INTERNALLY PLASTICIZED CASEIN FILES

| Run No. | Plasticizer | | Gurley Stiffneness[1] at— | | Tensile Strength[2] | Elongation, Percent |
|---|---|---|---|---|---|---|
| | Kind | Percent | 20% R.H. | 50% R.H. | | |
| 1 | CCC[3] | 10 | .55 | .28 | ------ | ------ |
| 2 | CCC | 15 | .37 | .28 | 3.68 | 1.5 |
| 3 | CCC | 20 | .38 | 15 | 2.39 | 6 |
| 4 | PEG 200[4] | 20 | .73 | .22 | 3.85 | 5 |
| 5 | PEG 600[4] | 20 | .92 | .28 | 4.36 | 1.5 |
| 6 | PEG 1500[4] | 20 | .80 | .28 | 4.64 | 1.5 |
| 7 | CCC<br>Glycerol | 20<br>24 | ------ | .15 | 1.11 | 36 |
| 8 | CCC<br>Glycerol | 20<br>48 | ------ | .13 | .26 | 84 |
| 9 | CCC<br>PEG 600 | 10<br>10 | 1.0 | .36 | 3.72 | 1.5 |
| 10 | CCC<br>Glycerol | 10<br>10 | .3 | .17 | 1.96 | 18 |

[1] Specimen tested: 1 inch wide, ½ inch span, 5 g. wt. in lower hole.
[2] Lbs./in. of specimen averaging .0015" thick.
[3] Carbowax 350 and phosgene reaction product, i.e., Carbowax chlorocarbonate.
[4] PEG polyethylene glycol, the figures that follow above being average molecular weight.

The Gurley stiffness is measured in an apparatus that is described in U.S. Patent 2,092,809. This machine measures the force necessary to deflect a strip of flexible material for a fixed amount. Scale readings can be converted to milligrams force by multiplying by the factor 2.78 for a strip of film of the size used in these tests. Since stiffness is a function of film thickness all measurements were made on a film .002 inch thick. The relative scale readings are thus proportional to the stiffness and are approximately proportional to the elastic modulus of the plasticized casein. The elongation is the percentage of stretch of the film before breaking.

It will be observed from the inverse of the stiffness figures, that the flexibility increases with the proportion of our polyalkoxylated chlorocarbonate which is grafted on the protein. It will be observed also that, with the lowest proportion, 10% of such plasticizer (Run No. 1), the Gurley stiffness at 20% relative humidity is only 0.55 whereas the stiffness so tested with 20% of various polyethylene oxides ranges from 0.73 to 0.92 (Runs 4, 5 and 6).

*Example 3*

A dry blend of permanently plasticized casein containing glycerine as a secondary plasticizer was made as follows:

| | Lbs. |
|---|---|
| Casein, lactic acid curded | 7.6 |
| Carbowax 350 chlorocarbonate | 1.5 |
| Sodium bicarbonate | 0.45 |
| Glycerine | 0.45 |

The casein and chlorocarbonate were blended for 15 minutes in an open mixer. The blend was then placed in polyethylene bag which was tied with string and placed in an oven set at 145° F. for 4.5 hours. At the end of this time the contents of the bag were returned to the mixer and the sodium bicarbonate was blended in. The glycerine was then added and the total mixture was blended for an additional 15 minutes. The product was a slightly moist freely flowing powder that had a good storage life.

*Example 4*

The product of Example 3 is dissolved and made into films in comparison with a casein containing unreacted plasticizers. In each case the product is dissolved in a minimum of hot water containing sufficient sodium hydroxide to raise the pH to 10. Films are made from these solutions and compared for Gurley stiffness as made and again after storage for one month between pieces of paper. Films B, C and D form no part of this invention.

| | Initial Stiffness | Stiffness After Storage in Paper |
|---|---|---|
| A | 0.3 | 0.4 |
| B | 0.4 | 0.9 |
| C | Brittle | |
| D | 0.3 | Brittle |

A. Internally plasticized casein of Example 3.
B. Raw casein of the type used in Example 3 containing 20 parts of raw Carbowax 350 (not reacted with chlorocarbonate) and 5 parts of glycerine per 100 parts of casein.
C. Raw casein as in B containing 5 parts of admixed glycerine.
D. Raw casein as in B containing 40 parts of admixed glycerine.

*Example 5*

There is made a composition consisting of the reaction product of acid precipitated casein 100 parts and 10 parts of the chlorocarbonate of ethoxy polypropylene oxide of molecular weight approximately 580 mixed with 6 parts of sodium bicarbonate. To this is added 10 parts of triethylene glycol admixed as temporary plasticizer. The procedures in making the composition and in casting and testing films are as described in Example 1.

*Example 6*

The use of the product made as described in any one of the previous examples in coating leather is illustrated as follows, the particular reaction product here used being that made in Example 1.

| | |
|---|---|
| Internally plasticized casein | 100 |
| Water | 640 |
| Borax, powdered | 12 |
| Preservative—p.t. butyl phenol | 1 |

The casein product is soaked in water for 30 minutes, the borax is stirred in and the mixture is heated to 140° F. to dissolve the casein. The solution is cooled to 80° F. and applied to the surface of tanned and dyed leather by brush and allowed to dry. The coated leather is then glazed in conventional fashion to bring out a high gloss. The coating is as flexible as a conventional casein coating employing glycerine as a plasticizer and retains its flexibility after aging at elevated temperatures which cause the glycerine plasticized coating to become brittle and crack. Pigmented leather coatings made with our plasticized casein also retained flexibility and freedom from cracks.

*Example 7*

The process and procedure of Example 3 are used exactly as they are described except that isolated soy protein and peanut protein are substituted in equal weight, separately and in turn for the casein, with similar results.

In using the casein treated product for paper coating and other purposes the compounding and techniques are the same as those used with ordinary casein or casein plasticized with glycerol or like temporary plasticizers. Thus the selected pigment or filler of kind and in amount that is conventional for a given purpose is mixed into a slightly alkaline aqueous solution of casein reacted with the alkoxylated chlorocarbonate ester as described in Example 1 and the whole coated onto the paper or like object to be coated. When unsupported casein film is to be made, as for a wrapper or package, it is cast in usual manner, dried and stripped from the drum or sheet upon which the casting was made.

It is to be understood that it is intended to cover all changes and modifications of the examples of the invention herein chosen for the purpose of illustration which do not constitute departures from the spirit and scope of the invention.

We claim:

1. A permanently plasticized protein composition comprising the product of reaction of an alkali soluble protein with a polyalkoxylated monochlorocarbonate ester in the proportion by weight of about 5 to 100 parts of said chlorocarbonate for 100 parts of the protein and a water soluble alkali in amount to establish the pH of the whole composition at a level above about 4.5, said product of the reaction providing a non-volatile, non-migratory plasticizing component in said product.

2. A permanently plasticized protein composition comprising the reaction product of a protein selected from the group consisting of casein, soy protein and peanut protein with a polyalkoxylated chlorocarbonate ester of the formula $ClCO(OC_nH_{2n})_xOR$ in which $n$ and $x$ are integers within the ranges 2–6 and 2–30, respectively, and R is an alkyl group having 1–6 carbon atoms.

3. The composition of claim 2 the said protein being casein and the proportion of said chlorocarbonate being about 5–100 parts for 100 parts of the casein.

4. The composition of claim 1 including an admixed temporary plasticizer selected from the group consisting of glycerol, water soluble glycols and glycol ethers.

5. The process of making a plasticized, film forming material which comprises mixing 100 parts by weight of an alkali soluble protein, in dry finely divided form, selected from the group consisting of casein, soy protein and peanut protein with a chlorocarbonate of the formula $ClCO(OC_nH_{2n})_xOR$ in which $n$ and $x$ are integers within the ranges 2–6 and 2–30, respectively, and R is an alkyl group having 1–6 carbon atoms in the amount of 5–100 parts of the chlorocarbonate for 100 parts of the protein, maintaining the resulting mixture at a temperature not above about 150° F. until reaction is substantially completed and hydrogen chloride is formed as a by-product, and then admixing a water soluble alkali in amount to establish the pH above 4.5.

6. The process of claim 5 the said protein being casein.

7. The process of claim 5 the chlorocarbonate being of the formula $ClCO(OCH_2CH_2)_7OCH_3$.

References Cited by the Examiner

UNITED STATES PATENTS

| | | | |
|---|---|---|---|
| 2,316,146 | 4/1943 | Adams et al. | 106—147 |
| 2,388,164 | 10/1945 | Loder | 106—147 |
| 2,727,027 | 12/1955 | Monson et al. | 260—119 |

ALEXANDER H. BRODMERKEL, *Primary Examiner.*

D. J. ARNOLD, *Assistant Examiner.*